(No Model.)
G. E. BARTHOLOMEW.
VEHICLE RUNNING GEAR.
2 Sheets—Sheet 1.
No. 349,136. Patented Sept. 14, 1886.
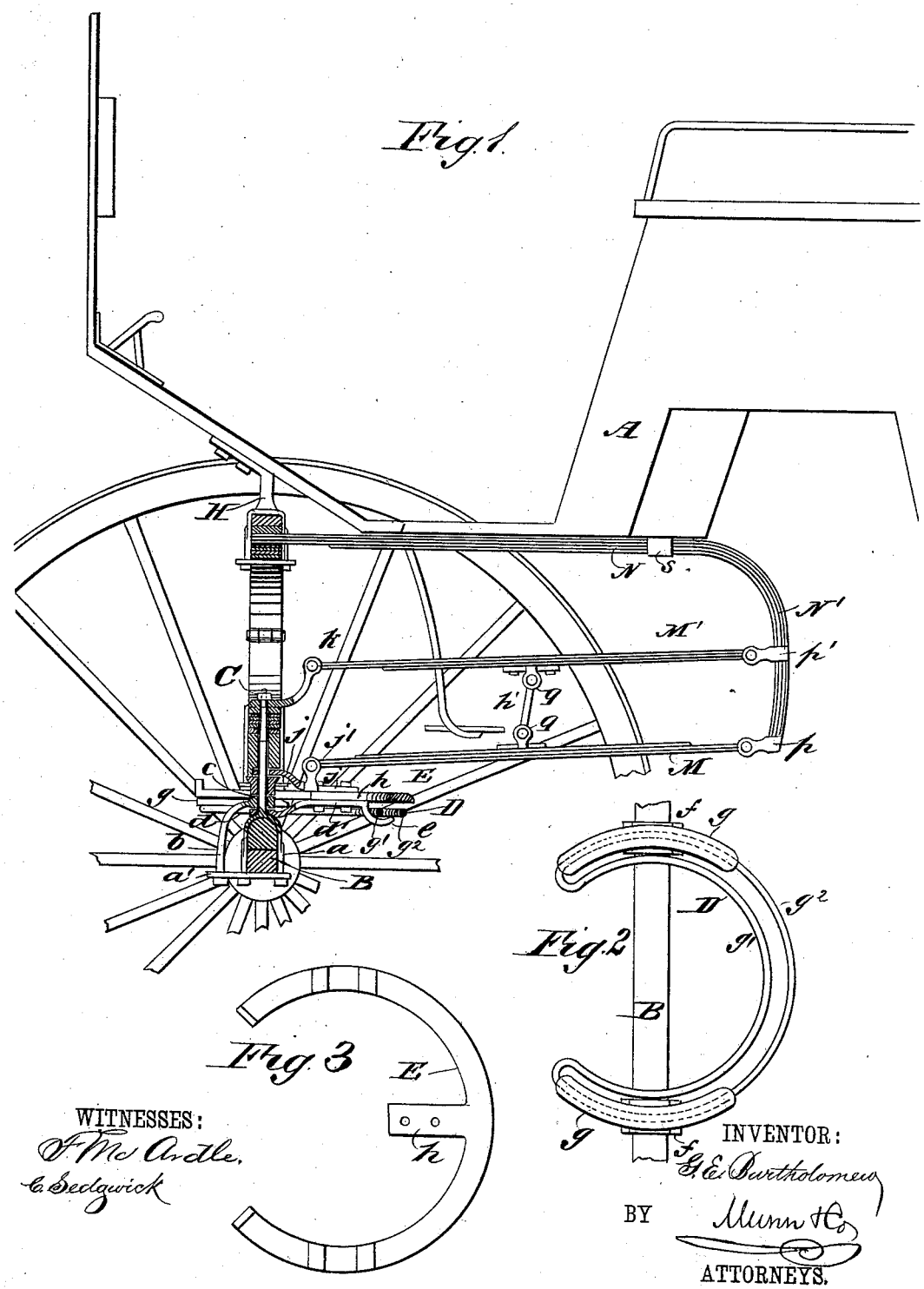
WITNESSES:
F. McArdle.
C. Sedgwick.
INVENTOR:
G. E. Bartholomew
BY Munn & Co.
ATTORNEYS.

(No Model.)
2 Sheets—Sheet 2.
G. E. BARTHOLOMEW.
VEHICLE RUNNING GEAR.
No. 349,136. Patented Sept. 14, 1886.
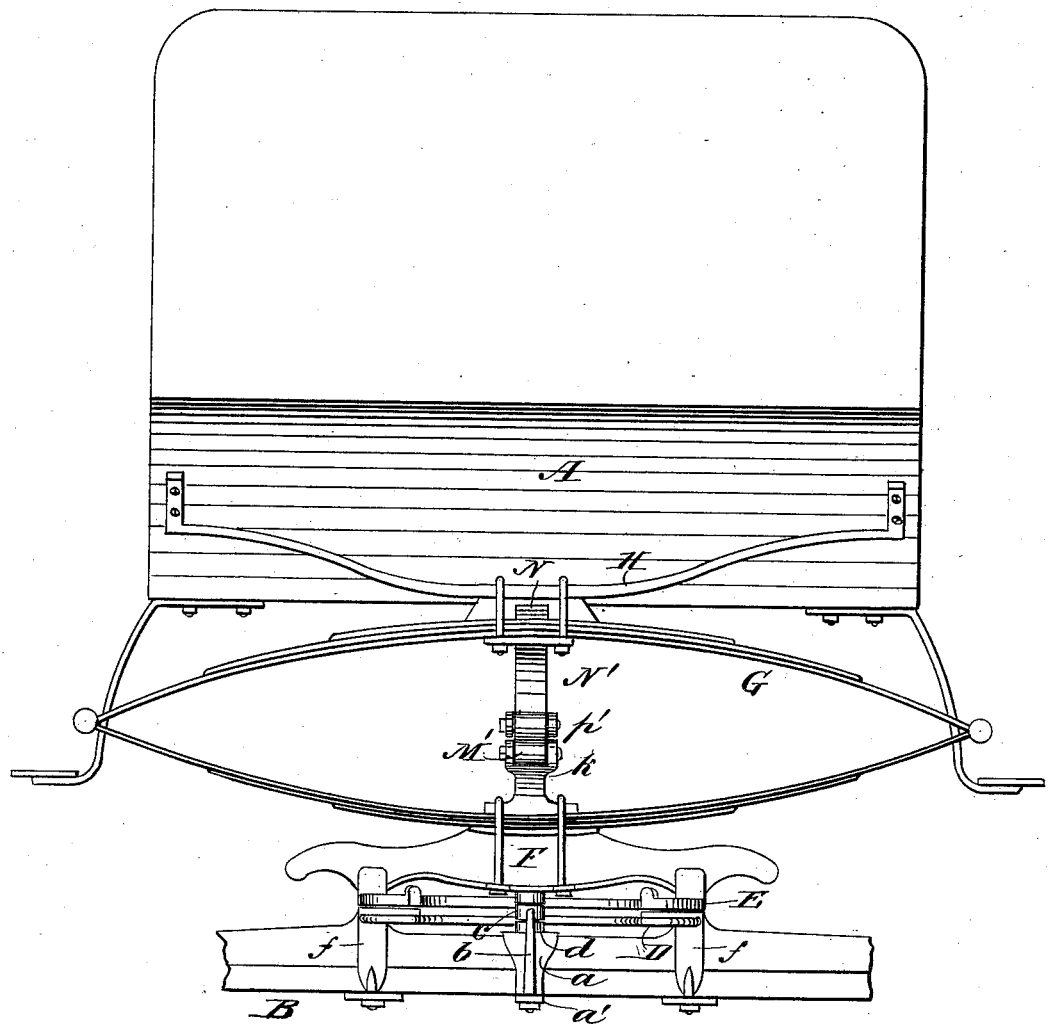
WITNESSES:
F. McArdle
C. Sedgwick
INVENTOR:
G. E. Bartholomew
BY Munn & Co
ATTORNEYS.

UNITED STATES PATENT OFFICE.

GEORGE E. BARTHOLOMEW, OF BROOKLYN, NEW YORK, ASSIGNOR TO HIMSELF AND EDMOND ARMANT, OF SAME PLACE.

VEHICLE RUNNING-GEAR.

SPECIFICATION forming part of Letters Patent No. 349,136, dated September 14, 1886.

Application filed December 26, 1885. Serial No. 186,755. (No model.)

*To all whom it may concern:*

Be it known that I, GEORGE EUGENE BARTHOLOMEW, of Brooklyn, in the county of Kings and State of New York, have invented a new and Improved Running-Gear for Vehicles, of which the following is a full, clear, and exact description.

My invention relates to the construction of running-gear for vehicles, whereby the ordinary form of platform-spring is dispensed with, as is also the reach by which the springs are connected, the invention being an improvement on that form of gear illustrated and described in Letters Patent No. 265,001, granted to me on the 26th day of September, 1882.

Reference is to be had to the accompanying drawings, forming a part of this specification, in which similar letters of reference indicate corresponding parts in all the figures.

Figure 1 is a side view of a portion of a vehicle provided with my improved form of running-gear, the spring, head-block, axle, &c., being shown in section. Fig. 2 is a plan view of the lower portion of the fifth-wheel. Fig. 3 is a view of the upper portion of said fifth-wheel. Fig. 4 is a front view of a portion of a vehicle provided with my improved running-gear. Fig. 5 is a detail view illustrating the construction of the safety-hook employed in connection with the fifth-wheel, and Fig. 6 is a view of the front brace.

Referring now to the construction illustrated in the drawings above referred to, A represents the body of the vehicle, the forward end of which is supported by an arrangement which will be hereinafter more specifically described.

B is the forward axle, to which the king-bolt C is secured by the clip $a$, which, as usual, passes about the axle-bed and the axle, the binding-bar, however, being formed with a forwardly-projecting arm, $a'$, which rigidly supports an upwardly-extending brace-arm, $b$, the top of which is formed as a collar, $c$, and extends inward to embrace the king-bolt C. Between the upper side of the clip $a$ and the collar $c$ there is arranged a collar, $d$, provided with an inwardly-extending arm, $d'$, upon the end of which there is a hook, $e$.

The lower portion, D, of the fifth-wheel, which is shown in detail in Fig. 2, is held in place by clips $f\,f$, which, as usual, pass about the axle-bed and axle. This portion of the fifth-wheel is of peculiar construction, being provided with two side bearing-plates, $g\,g$, and two concentric hoops, $g'\,g''$, as shown in Figs. 1 and 2.

The upper section, E, of the fifth-wheel is rigidly fixed, in the ordinary manner, to the head-block F. This portion of the fifth-wheel is provided with a forwardly-projecting arm, $h$, to which the rearwardly-extending arm $d'$ is bolted. Above the brace-arm $b$ there is arranged an arm, $j$, the forward end of which is socketed to receive the king-bolt, while the rear end is provided with a shackle, $j'$, the whole device being rigidly secured to the forwardly-extending arm of the upper portion of the fifth-wheel by the same bolts used to secure the hook-arm $d'$.

Above the lower section of the spring G there is secured a second shackle, $k$, while to the upper side of the said spring there is attached a spring-bar, H, which is in turn secured to the carriage-body A.

If the running-gear consisted simply of the parts above described, it will of course be understood that there would be nothing to hold the parts and the wagon-body in the relative positions shown against the strain to which they would be subjected when the vehicle was in motion; but in order that the said parts and the vehicle-body may be held in substantially the position in which they are shown in the drawings, I fix a heavy draw-bar, N, to the center of the bottom of the forward portion of the wagon-body, connection being made in any manner desired, but preferably by means of a clip, as $s$. This draw-bar extends forward to rest upon the center of the upper section of the spring G, being held in place by the bolt by which the leaves of said upper section are united. The rear end of this draw-bar is curved downward, as shown at N′, and to the extreme lower end there is fixed a shackle, $p$, which engages with and holds one end of the brace M, the other end of said brace being held by the shackle $j'$.

At a suitable distance above the shackle $p$ the downwardly-curved portion N' of the draw-bar N carries another shackle, p', which engages and holds one end of a second brace, M', the forward end of said brace being supported and held by the shackle k. From this construction it will be seen that the force of the draft is transferred directly to the body of the vehicle, and that all strain upon the spring G or the parts through which the king-bolt passes will be avoided.

In order that the braces M M' may be held under tension and prevented from rattling, I provide each brace with a shackle, q, said shackles being riveted or bolted to the braces in the position shown in Fig. 1, and between the shackles I fix a link, h', which is pivotally connected to the shackles and sprung to place under a heavy pressure, so that both ends of each of the braces are held tight against the bolts by which they are connected to their supporting-shackles.

The brace or stay b is so arranged as to act as a support for the king-bolt, and at the same time prevent any swaying of the axle and axle-bed from a vertical plane.

The arm d' acts as the king-bolt stay, as well as the support for the safety-hook e, and, in connection with the brace b, insures a perfect staying or bracing of the said king-bolt.

Having thus fully described my invention, what I claim as new, and desire to secure by Letters Patent, is—

1. The combination, with a vehicle-body and its forward running-gear, of a draw-bar centrally fixed to the forward portion of the vehicle-body, and connected by braces to the said forward running-gear, a link, h', being sprung in between the two braces, substantially as described.

2. The combination, with a vehicle-body and its forward running-gear, of a draw-bar, N, centrally fixed to the forward portion of the vehicle-body, and forwardly held by the upper spring-bolt of braces M and M', arranged in the same vertical plane as the draw-bar N, and shackles j, k, p, and p', arranged substantially as described.

3. The combination, with a vehicle-body and its forward running-gear, of a draw-bar, N, and braces M M', the brace M being held by shackles j' and p, said shackle j' being carried by an arm, j, arranged as described, and the brace M' being held by shackles k and p', the two braces being held under tension by a link, h', substantially as described.

4. In a vehicle, the combination, with the body and its spring G, of the fifth-wheel, in which the section D is provided with the circular bar g', and of an arm, d', formed with a hook, e, said arm being socketed at d and fixed to the arm h of the upper portion of the fifth-wheel, substantially as described.

5. In a vehicle, the combination, with the body and its forward running-gear, of the forward brace, b, and the rearwardly-extending brace d', arranged in rear of the axle and fixed to the arm h of the upper portion of the fifth-wheel, and encircling the king-bolt above the axle-bed, substantially as described.

GEORGE E. BARTHOLOMEW.

Witnesses:
 EDWARD KENT, Jr.,
 C. SEDGWICK.